Figures 1, 2:
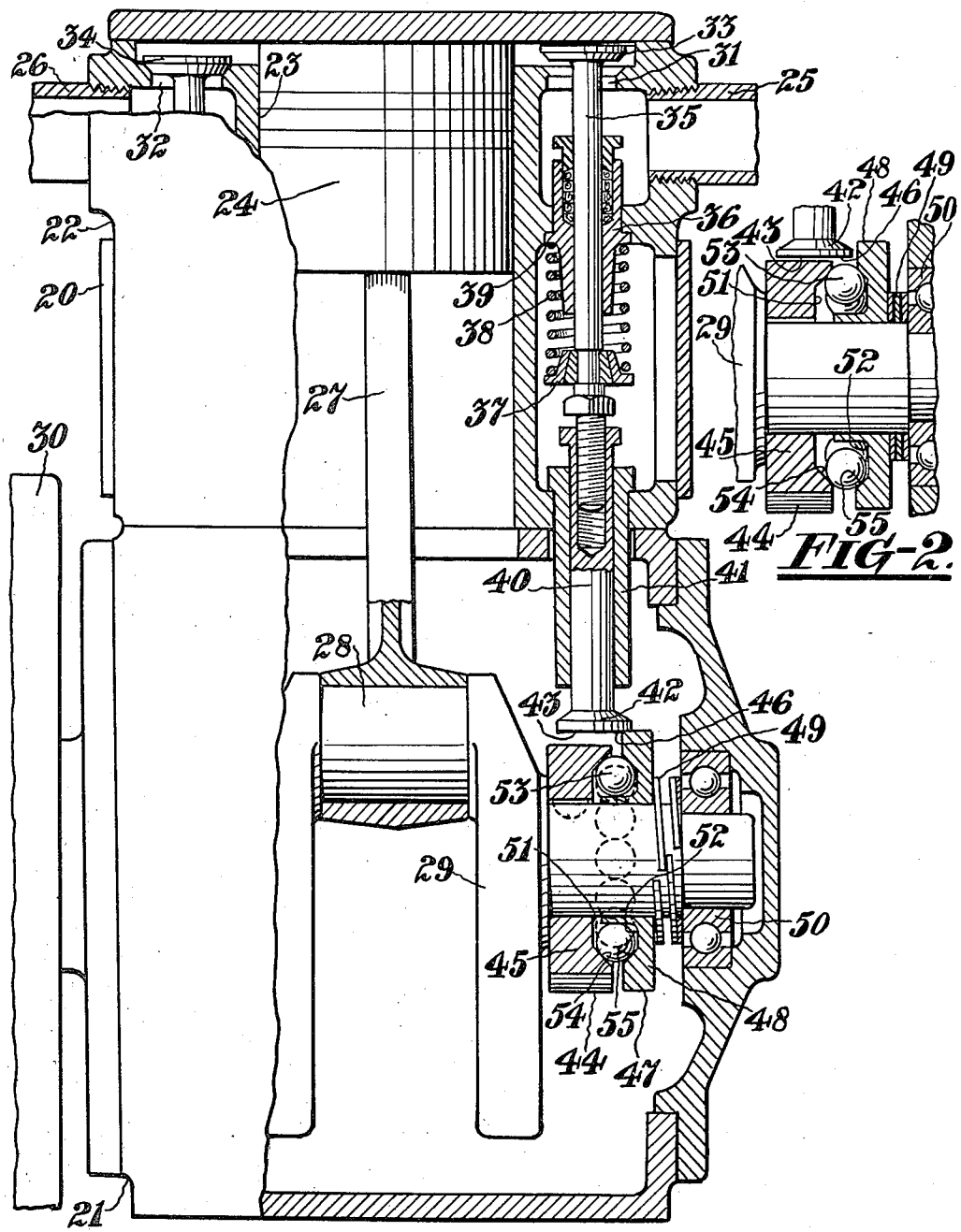

Oct. 20, 1936.  J. LE VALLEY  2,057,837

UNLOADING DEVICE FOR COMPRESSORS

Filed May 3, 1935

INVENTOR.
John LeValley
BY
HIS ATTORNEY.

Patented Oct. 20, 1936

2,057,837

UNITED STATES PATENT OFFICE 2,057,837

UNLOADING DEVICE FOR COMPRESSORS

John Le Valley, Painted Post, N. Y., assignor to Ingersoll-Rand Company, Jersey City, N. J., a corporation of New Jersey Application May 3, 1935, Serial No. 19,587

6 Claims. (Cl. 230—29)

This invention relates to unloading devices, and more particularly to an unloading device for compressors.

One object of the invention is to minimize the load on the prime mover of the compressor during the starting period of the compressor.

Another object is to produce an inexpensive and simplified unloading device which may be cheaply maintained and which will be positive in operation.

Other objects will be in part obvious and in part pointed out hereinafter.

In the drawing accompanying this specification and in which similar reference numerals refer to similar parts, Figure 1 is an elevation, partly in section, of a compressor equipped with an unloading device constructed in accordance with the practice of the invention and showing the loading device in position to unload the compressor, and Figure 2 is a similar view of the unloading device showing it in the position which it occupies when the compressor is operating normally, that is, fully loaded.

Referring more particularly to the drawing, 20 designates a compressor comprising a base plate 21 upon which is mounted a cylinder 22 which may be secured to the base plate in any well known manner.

The cylinder 22 is bored to provide a compression chamber 23 containing a piston 24 to compress fluid which may enter the compressor through a conduit 25 and, upon being compressed, pass from the compressor through a discharge pipe 26. The piston 24 is provided with the usual connecting rod 27 connected to a pin 28 of a crank shaft 29 supported by the base plate 21 and which may be connected directly to a prime mover 30.

Communication between the compression chamber 23 and the conduits 25 and 26 is afforded by ports 31 and 32 which are controlled by valves 33 and 34, respectively. The valves illustrated are of the poppet type and identical in all essential respects, so that a description of one will suffice for both.

Among the elements associated with the valve 33, which in this case is the inlet valve, is the usual valve stem 35 which is guided by a bushing 36 seated in the cylinder wall, and on the stem 35 is a seat 37 for the lower end of a spring 38 which encircles the valve stem 35 and seats with its opposite or upper end against a shoulder 39 on the periphery of the guide bushing 36. The lower end of the stem 35 is threaded into a push rod 40 which extends with its free end to a point near the crank shaft 29 and is guided by a bushing 41 seated in the wall of the cylinder 22.

On the lower end of the push rod 40 is a head 42 of which the free end constitutes a thrust surface 43 to receive the thrusts of the lift 44 of a cam 45 keyed to the crank shaft 29 in the plane of the push rod 40. Thus, during the operation of the compressor, the valve 33 is lifted by the cam 45 and is maintained open during the suction stroke of the piston 24 to permit the free passage of fluid medium from the conduit 25 into the compression chamber 23. The valve 34 is, of course, operated in like manner to afford communication between the compression chamber 23 and the discharge conduit 26 during the compression stroke of the piston 24, as will be understood.

As a preferred arrangement, and in accordance with the practice of the invention, the cam 45 is preferably off-set slightly with respect to the push rod 40 so that the lift 44 of the cam will brush across only a portion of the end surface 43 of the head 42, thus leaving a portion 46 of the surface 43 out of the plane of movement of the lift 44 to seat against the peripheral surface 47 of an abutment member or plate 48 disposed slidably upon the crank shaft 29. The plate 48 is positioned closely adjacent the cam 45 toward which it is urged by a spring 49 interposed between the plate 48 and a bearing 50 for the crank shaft 29.

In the confronting surfaces of the cam 45 and the plate 48 are recesses 51 and 52, respectively, which cooperate to form a receptacle for a plurality of weights 53, illustrated as being in the form of balls. The outer bounding surfaces 54 and 55 of the recesses 51 and 52, respectively, are inclined and converge toward each other to provide surfaces against which the balls 53 may act for shifting the plate 48 with respect to the cam.

The distance which the plate 48 may travel in the direction of the spring 49 is preferably determined by the spring itself, that is, the spring may consist of a suitable number of coils which, when pressed into body contact with each other, as when the plate 48 has been moved out of the plane of the head 42, will prevent further movement of the plate 48 away from the cam 45 and thereby hold the plate 48 sufficiently close to the cam to prevent rejection of the balls 53 from the recesses 51 and 52.

The operation of the device is as follows: When the compressor is first set in operation, and at the beginning of which period the centrifugal force of the balls 53 is a negligible factor, the spring 49 will press the plate 48 inwardly toward the cam 45, and when the cam lifts the valve 33 the plate 48 will be moved beneath the head 42 and will be held in that position by the spring 49 during the time the crank shaft is accelerating. The plate 48 will thus serve to hold the valve 33 open and the fluid medium will then be merely drawn into and expelled from the compression chamber through the port 31.

The radius of the lift 44 of the cam 45 is only slightly larger than the radius of the plate 48 so that upon each contact of the lift 44 with the surface 43 of the head 42 the valve 33 will be lifted only a slight distance but will remain open until the speed of the crank shaft approaches or reaches normal, at which time the centrifugal force of the weights 53 acting against the inclined surfaces 54 and 55 will overcome the pressure of the spring 49 and shift the plate 48 out of the plane of the head 42. The valve will then rise and fall with the cam to control the port 31 and the compressor will operate under full load.

I claim:

1. In an unloading device for compressors, the combination of a cylinder having a port and a valve controlling the port, a shaft, means on the shaft for opening the valve during the normal operation of the compressor, and means on the shaft acting responsively to a certain predetermined speed to move into the plane of the valve during the decelerating period of the compressor to hold said valve open and to move out of the plane of the valve during the accelerating period of the compressor to enable the first-named means to become operative.

2. In an unloading device for compressors, the combination of a cylinder having a port and a valve to control the port, a shaft, means on the shaft to open the valve, abutment means on the shaft, means for shifting the abutment means into the plane of the valve to hold the valve open during the starting of the compressor, and means moved centrifugally for holding the abutment means out of valve abutting position during the normal operation of the compressor.

3. In an unloading device for compressors, the combination of a cylinder having a port and a valve to control the port, a shaft, a cam thereon to open the valve, spring-pressed abutment means on the shaft to abut and hold said valve open during the starting of the compressor, and centrifugally actuated means for rendering the abutment means ineffective during the normal operation of the compressor.

4. In an unloading device for compressors, the combination of a cylinder having a port and a valve to control the port, a shaft, a cam thereon to open the valve, spring-pressed abutment means to abut and hold the valve open during the starting period of the compressor and being slidable on the shaft, and weights between the cam and the abutment means and being moved centrifugally to move the abutment means out of valve abutting position when the compressor attains a certain predetermined speed.

5. In an unloading device for compressors, the combination of a cylinder having a port and a valve controlling the port, a shaft, a cam on the shaft to open the valve, spring-pressed means on the shaft to move into the plane of the valve and cause contact between said means and said valve to hold the valve open, and centrifugally actuated weights between the cam and the spring-pressed means and acting against each to shift the spring-pressed means out of valve abutting position.

6. In an unloading device for compressors, the combination of a cylinder having a port and a valve to control the port, a shaft, a cam on the shaft, a transmission member for transmitting the thrust of the cam to the valve, abutment means on the shaft for the transmission member to hold the valve open, means actuated centrifugally for maintaining the abutment means out of the plane of the transmission member during the normal operation of the compressor, and means for moving the abutment means into the plane of the transmission member during the starting period of the compressor.

JOHN LE VALLEY.